United States Patent [19]

Agbay

[11] Patent Number: 4,828,300
[45] Date of Patent: May 9, 1989

[54] RETAINING RING
[75] Inventor: Anthony J. Agbay, Auburn, Mass.
[73] Assignee: Olson Manufacturing Co.
[21] Appl. No.: 103,368
[22] Filed: Oct. 1, 1987
[51] Int. Cl.$^4$ ............................................. B65D 45/32
[52] U.S. Cl. ................................... 292/256.6; 24/279; 220/319; 248/553; 285/407
[58] Field of Search ............ 292/256.6, 256.61, 256.63, 292/256.65, 256.69; 70/19, 163, 164; 220/210, 319–321; 248/230, 231, 551, 553, 310, 312.1; 285/365, 407; 24/279, 280, 20 CW, 16 PB

[56] References Cited

U.S. PATENT DOCUMENTS

| 643,908 | 2/1900 | Meyer | 292/256.69 |
|---|---|---|---|
| 1,991,301 | 2/1935 | Townsend | 292/256.69 |
| 2,071,971 | 2/1937 | Draper et al. | 292/256.61 |
| 2,242,643 | 5/1941 | Conner | 292/256.69 |
| 2,633,266 | 3/1953 | Cookson | 292/256.6 |
| 2,662,788 | 12/1953 | Carpenter | 292/256.6 |
| 3,185,171 | 1/1980 | Brown | 292/256.69 |
| 4,611,478 | 9/1986 | Carlson et al. | 292/256.6 X |

FOREIGN PATENT DOCUMENTS

| 1058737 | 11/1953 | France | 292/256.6 |
|---|---|---|---|
| 429329 | 7/1967 | Switzerland | 285/365 |
| 370940 | 4/1932 | United Kingdom | 292/256.69 |

Primary Examiner—Lloyd A. Gall
Attorney, Agent, or Firm—Samuels, Gauthier, Stevens & Kehoe

[57] ABSTRACT

A split retaining ring is disclosed for detachably interconnecting a pair of axially aligned circular rims. The ring has ends and a circular side wall with front and rear flanges protruding radially inwardly therefrom. The ring ends are resiliently separable to accommodate installation and removal of the ring onto and off of the rims, and are resiliently closeable to confine the rims radially within the ring side wall and axially between its flanges. The rear flange has a radially tapered configuraiton with oppositely disposed minimum radial dimensions arranged to minimize the extent of separation required between the ring ends during installation and removal.

7 Claims, 3 Drawing Sheets

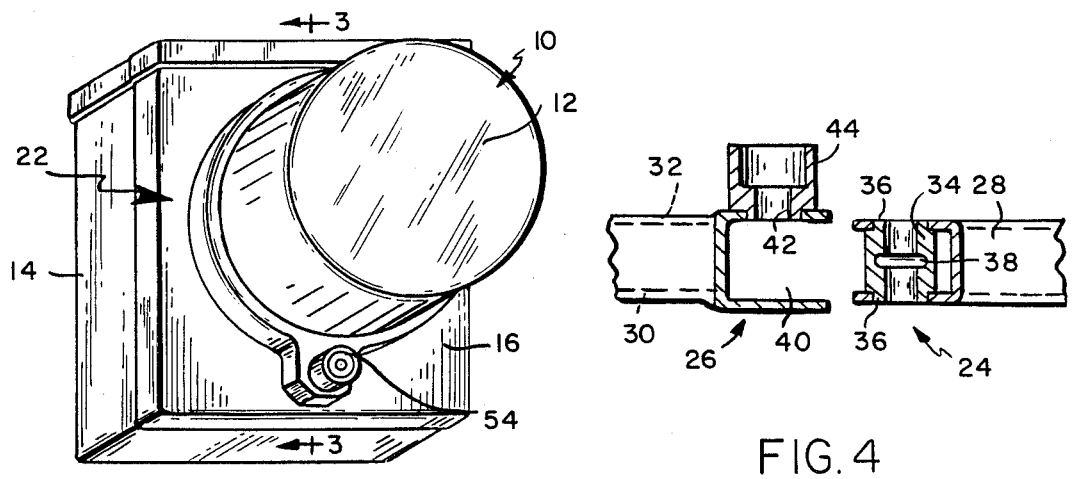
FIG. 1
FIG. 4
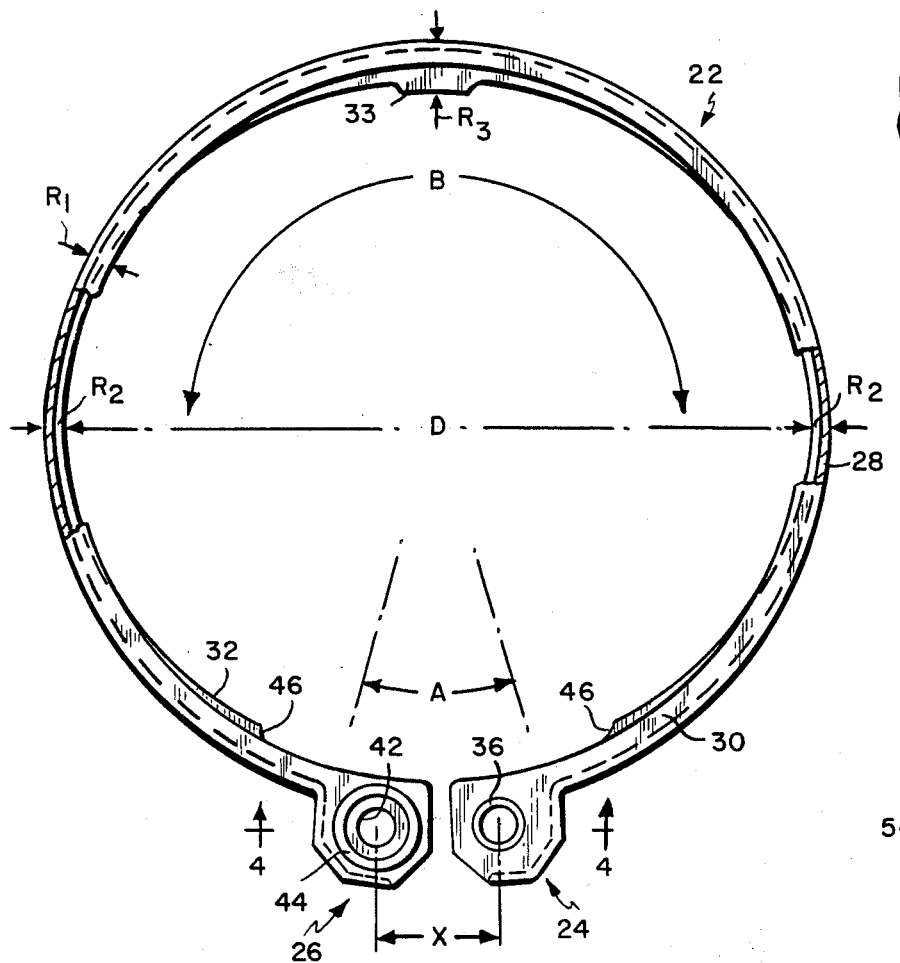
FIG. 2
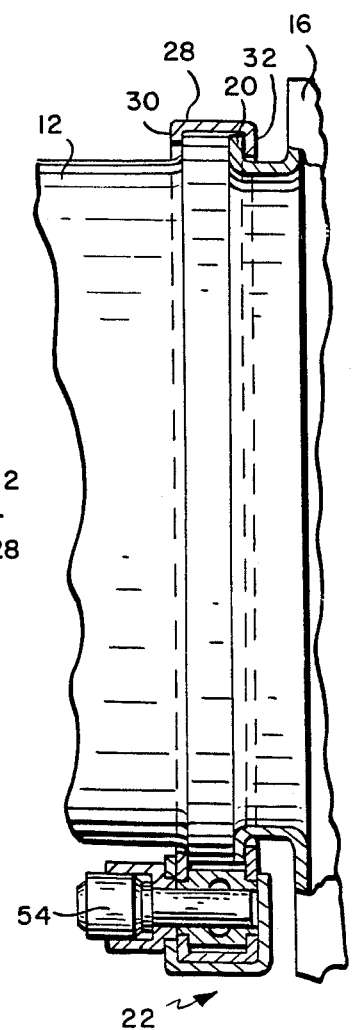
FIG. 3

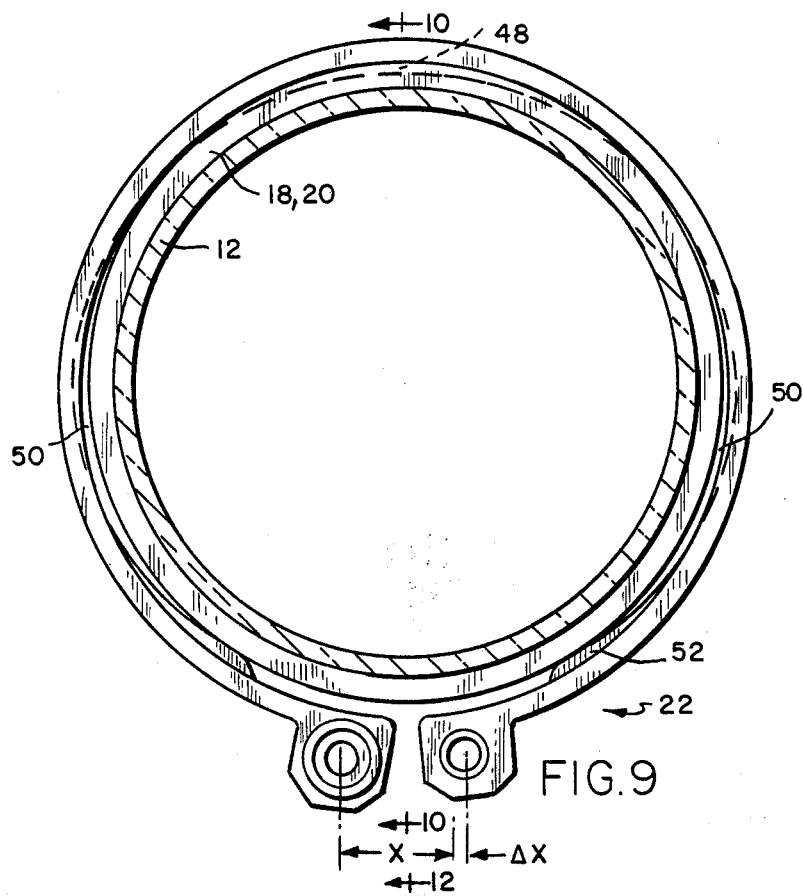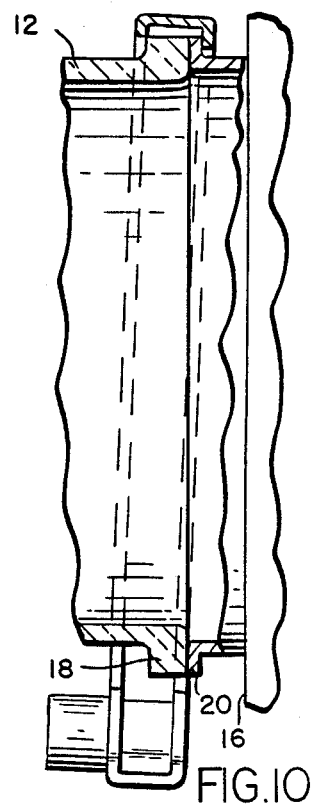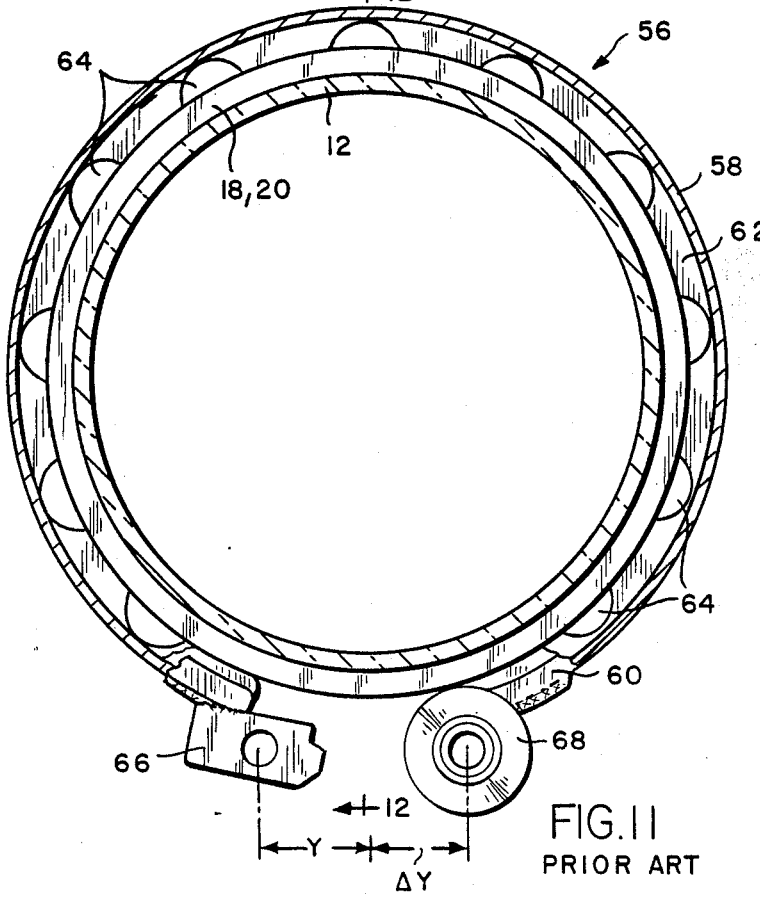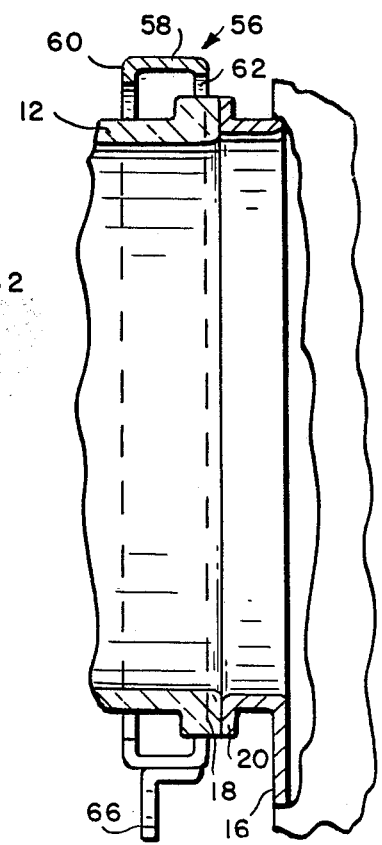
FIG. 9
FIG. 10
FIG. 11 PRIOR ART
FIG. 12 PRIOR ART

RETAINING RING

BACKGROUND OF THE INVENTION

This invention relates to an improved retaining ring for an electric meter housing.

DESCRIPTION OF THE PRIOR ART

In the conventional electric meter, the meter housing is removably plugged into a meter box having a face plate, with the meter housing and face plate each having circular coaxially aligned rims held together by a split metal retaining ring. The retaining ring has resiliently separable ends and a generally channel-shaped cross section defined by a circular side wall with radially inwardly protruding front and rear flanges. The ring ends are resiliently separated to accommodate installation and removal of the retaining ring onto and off of the coaxially aligned housing and face plate rims. Once installed, the ring ends are resiliently closed and locked together by a conventional locking mechanism, with the housing and face plate rims thus being securely confined radially within the side wall of the retaining ring as well as axially between its front and rear flanges.

Considerable difficulty is encountered during the installation and removal of such retaining rings due to the fact that a substantial force is required to resiliently separate the ring ends. This in turn generates very high bending stresses in the retaining ring, particularly in the region disposed oppositely to the resiliently separable ring ends.

In an attempt at lessening the forces required to resiliently separate the ring ends, it has been proposed to cut a series of scallops into the rear flange. Experience has indicated, however, that the scallops tend to produce dangerous stress concentrations which can exceed the yield strength of the ring material, thus causing the front flange to split.

An objective of the present invention is to provide the rear flange of the retaining ring with a contoured shape which minimizes the extent to which the ring ends must be resiliently separated during installation and removal.

A companion objective of the present invention is to provide the rear flange of the retaining ring with a contoured shape which evenly distributes bending stresses throughout that region of the ring which is most highly stressed as a result of the ring ends being resiliently separated during installation and removal.

SUMMARY OF THE INVENTION

In accordance with the present invention, the rear flange of the retaining ring is provided with a tapered radial width having oppositely disposed minimum radial dimensions arranged to enlarge the opening defined by the rear flange, thereby minimizing the extent of separation required between the ring ends in order to move the rear flange past the coaxially aligned rims of the meter housing and meter box face plate during installation and removal of the ring. The tapering radial width configuration of the rear flange results in the bending stresses associated with resilient separation and closure of the ring ends being substantially evenly distributed over the more highly stressed region of the ring. In a preferred embodiment to be described hereinafter in greater detail, the minimum radial dimensions of the rear flange are disposed at 90° and 270° from the region occupied by the ring ends, with the inner edge of the rear flange being shaped to define a substantially elliptical opening.

BRIEF DESCRIPTION OF THE DRAWINGS

FIG. 1 is a perspective view of a typical meter installation incorporating a retaining ring in accordance with the present invention;

FIG. 2 is a front elevational view of a retaining ring of the present invention, in an unstressed state;

FIG. 3 is a sectional view on an enlarged scale taken along line 3—3 of FIG. 1;

FIG. 4 is a sectional view taken along line 4—4 of FIG. 2;

FIG. 9 is a view similar to FIG. 5 showing the maximum extent of separation between the ends of the ring of the present invention during installation and removal;

FIG. 10 is a sectional view taken along line 10—10 of FIG. 9;

FIG. 11 is a sectional view similar to FIG. 7 showing the maximum extent of separation between the ends of the prior art retaining ring; and FIG. 12 is a sectional view taken on line 12—12 of FIG. 11.

DESCRIPTION OF ILLUSTRATED EMBODIMENT

Figure 5:
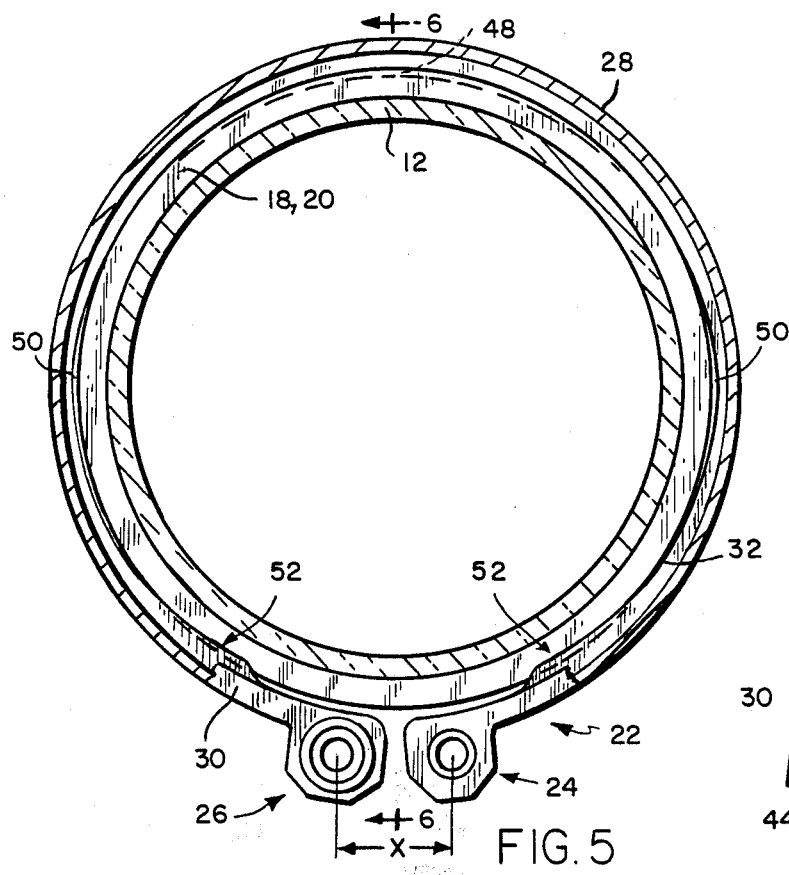
FIG. 5 is a sectional view taken through the meter housing and showing the retaining ring of the present invention during an initial phase of its installation.

Referring initially to FIGS. 1-4, a conventional electric meter is shown at 10 comprising a meter housing 12 removably plugged into a meter box 14 having a face place 16. The meter housing and face plate are respectively provided with coaxially aligned circular rims 18,20 held together by a split metal retaining ring 22. The retaining ring has resiliently separable male and female ends 24, 26 and a generally channel-shaped cross section defined by a circular side wall 28 with radially inwardly protruding front and rear flanges 30,32.

The male end 24 contains a sleeve 34 which extends transversely between openings 36 in the front and rear flanges 30,32, and which has an internal circular groove 38. The female end 26 defines a socket 40 appropriately shaped and dimensioned to receive the male end, with an openbing 42 communicating with an external lock housing 44. In the unstressed state, the openings 36, 42 are separated one from the other by a distance "X".

As can be best seen in FIG. 2, the front flange 30 has a uniform radial dimension $R_1$. The rear flange 32 has a radially tapered configuration with oppositely disposed minimum radial dimensions $R_2$, and with a maximum radial dimension $R_3$ disposed 180° from the region "A" occupied by the male and female ends 24, 26. The minimum dimensions $R_2$ are located at approximately 90° and 270° from the region A, and at about 90° on either side of the maximum radial dimension $R_3$. The radial dimension $R_1$ of the front flange 30 is less than the maximum radial dimension $R_3$, and greater than the minimum radial dimensions $R_2$. The inner edge of the rear flange 32 circumscribes a generally elliptical opening having a maximum diameter "D". The rear flange may be cut away as at 46 at locations adjacent to the male and female ends 24,26, and the maximum radial dimension $R_3$ may define a small radially inwardly protruding tab 33.

Figure 6:
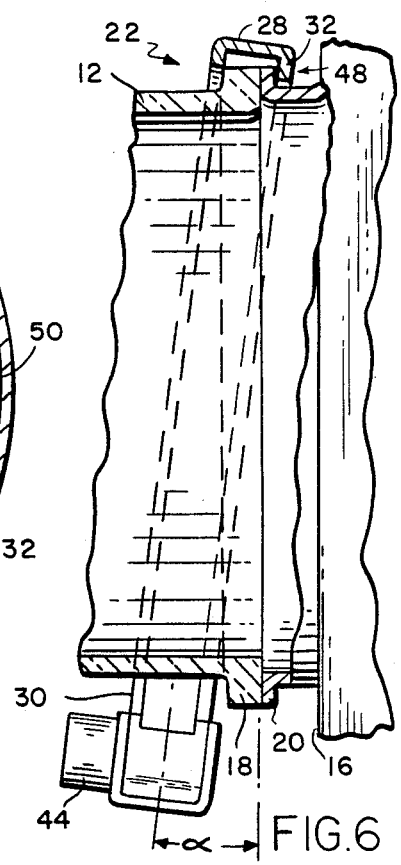
FIG. 6 is a sectional view taken on line 6—6 of FIG. 5.

Referring now to FIGS. 5 and 6, it will be seen that during the initial stage of installation, the tapered configuration of the rear flange 32 and the eliptical opening defined by its inner edge allows the unstressed ring to be applied to the rims 18,20 at an angle $\alpha$. When thus applied, the portion of the rear flange 32 at its maximum radial dimension $R_3$ underlies the rims as at 48, with the portions of the rear flange at its minimum radial dimensions $R_2$ being radially spaced from the rims as at 50, and with only the rear flange portions adjacent to the male and female ends overlapping the rim 18 as at 52.

As shown in FIGS. 9 and 10, the next installation stage simply entails resiliently spreading the male and female ends by a small incremental distance $\Delta X$ in order to position the previously overlapped portions 52 of the rear flange around the rims 18,20. The ring can then be pushed past the rims to the position shown in FIGS. 1 and 3. The rims 18,20 are now confined radially within the ring side wall 28 and axially between the front and rear ring flanges 30,32. Once this has been accomplished, the male and female ends are resiliently closed and interconnected by a conventional barrel lock 54 of the type described for example in U.S. Pat. No. 4,513,591, the disclosure of which is herein incorporated by reference.

The modest spread $\Delta X$ of the male and female ends 24,26 requires minimum force, thus making it much easier to install and remove the ring. This is particularly advantageous in so called "gang" installations where a plurality of meters are closely grouped together. The minimum force required to spread the ring ends also generates minimum bending stresses in the region "B" of the ring. Because of the gradual taper of the rear flange 32 in opposite directions from its maximum radial dimension $R_3$ to its minimum radial dimensions $R_2$, these bending stresses are substantially evenly distributed throughout region "B". Thus, dangerous stress concentrations are avoided.

Figure 7:
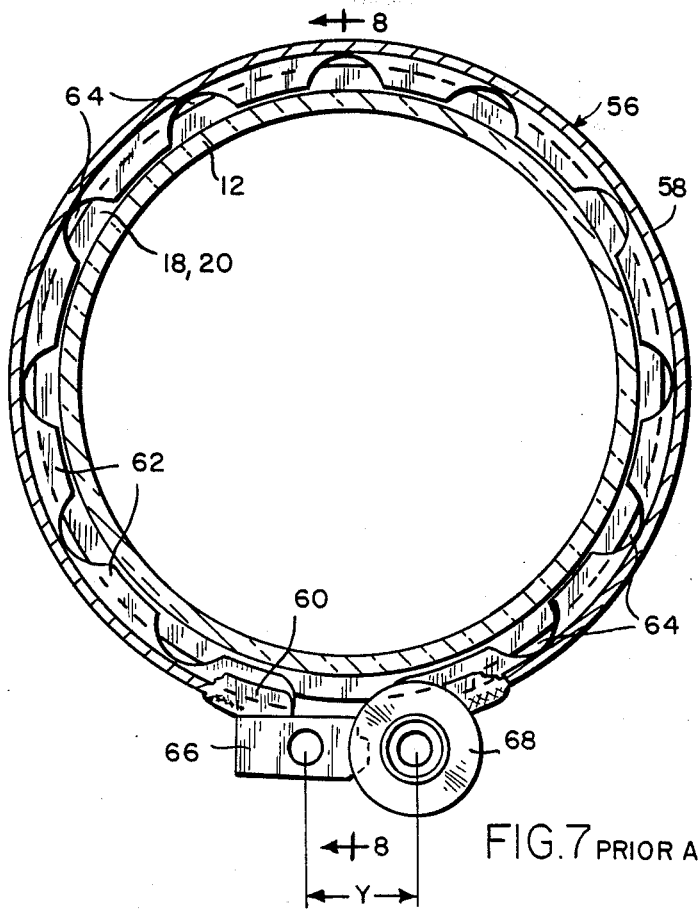
FIG. 7 is a view similar to FIG. 5 showing a prior art ring with a scalloped rear flange.
Figure 8:
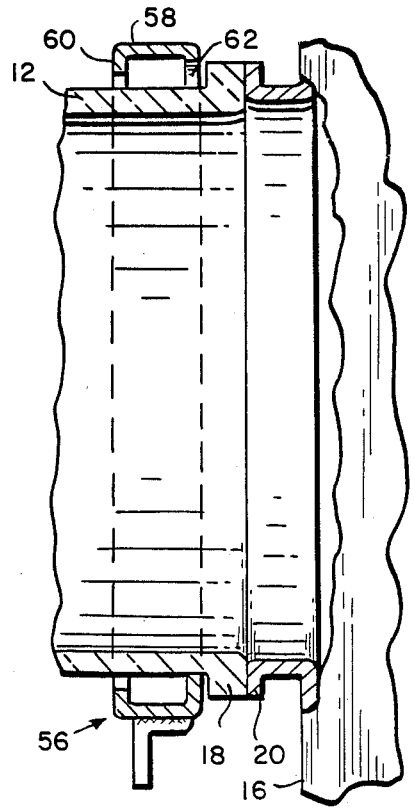
FIG. 8 is a sectional view taken on line 8—8 of FIG. 7.

The foregoing stands in sharp contrast to the prior art ring 56 shown in FIGS. 7, 8 and 11,12. Here again, the ring is provided with a circular side wall 58 and front and rear flanges 60,62. The rear flange 62 of the ring is scalloped as indicated typically at 64 in order to lessen resistance to opening of the male and female ends 66,68. However, as shown in FIGS. 7 and 8, in the unstressed condition with a distance "Y" between the openings in the male and female ends, all of the unscalloped segments of the rear flange overlap the rim 18 of the meter housing, thus preventing the initial angular application which characterizes the installation of the ring of the present invention, as shown in FIGS. 5 and 6. As shown in FIG. 11, in order to complete the installation of the prior art ring 56, its male and female ends 66,68 must be additionally spread by a substantial distance $\Delta Y$ in order to encircle the rims 18, 20 with the unscalloped segments of the rear flange 62. This unavoidably gives rise to high bending stresses, particularly in the region opposite to the ring ends 66, 68. Such stresses are further concentrated at the scallops. As previously indicated this can give rise to a failure of the front flange 60.

Advantageously, the ring side wall 28, the front and rear flanges 30,32 and the male and female ends 24,26 (excluding the sleeve 34 and lock housing 44) comprise a unitary metal stamping. As compared to rings which have end closures welded to the side walls, this reduces manufacturing costs while providing a much stronger structure.

It will thus be seen that as compared to the prior art, the retaining ring of the present invention offers significant advantages, including ease of installation and removal due to a lessening of the forces required to resiliently separate the ring ends, and an avoidance of stress fractures due to a substantially even distribution of bending stresses in the more highly stressed regions of the ring.

In light of the foregoing, it will now be appreciated by those skilled in the art that various changes and modifications can be made to the embodiment herein chose for purposes of disclosure without departing from the spirit and scope of the invention as defined by the claims appended hereto. For example, and without in any way limiting the scope of such changes and modifications, it would be possible to change the configuration of the ring ends to something other than male and female components, e.g., confronting ears adapted to be bolted or locked together. The relative flange dimensions may also be varied to suit particular requirements.

I claim:

1. A split retaining ring for detachably interconnecting a pair of axially aligned circular rims, said ring having ends and a circular side wall with front and rear flanges protruding radially inwardly therefrom, said ends being resiliently separable to accommodate installation and removal of said ring onto and off of said rims, said ends being resiliently closeable to connect said ends and to confine said rims radially within said side wall and axially between said flanges, said rear flange having:
   (a) a maximum radial dimension at a first location disposed oppositely to said ends;
   (b) confronting minimum radial dimensions at second locations respectively arranged approximately 90° on either side of said first location; and
   (c) gradually and continuously radially tapering portions leading from said first location to each of said second locations.

2. The retaining ring of claim 1 wherein the configuration of said rear flange is such that the bending stresses associated with separation and closure of said ends are substantially evenly distributed throughout the region of said ring which is opposite to the region occupied by said ends.

3. The retaining ring of claim 1 wherein said front flange has a uniform radial width which is less than said maximum dimension and greater than said minimum dimensions.

4. The retaining ring of claim 1 wherein the inner edge of said rear flange is shaped to define a partially elliptical opening.

5. A retaining ring according to any one of claims 1, 2, 3, or 4 wherein said side wall, front and rear flanges and said ends comprise a unitary metal stamping.

6. A split retaining ring for detachably interconnecting a pair of axially aligned circular rims, said ring comprising a one piece metal stamping having male and female ends and a circular side wall with front and rear flanges protruding radially inwardly therefrom, said ends being resiliently separable to accommodate installation and removal of said ring onto and off of said rims, said ends being resiliently closeable to locate said male end within said female end and to confine said rims radially within said side wall and axially between said flanges, said male and female ends having openings therein which are aligned to accommodate receipt of a separate locking mechanism when said male end is located within said female end, said rear flange having:

(a) a maximum radial dimension at a first location disposed oppositely to said ends;

(b) confronting minimum radial dimensions at second locations respectively arranged approximately 90° on either side of said first location; and (c) gradually and continuously radially tapering portions leading from said first location to each of said second locations.

7. The split retaining ring of claim 6 wherein the configuration of said rear flange is such that the bending stresses associated with separation and closure of said male and female ends are substantially evenly distributed throughout the region of said ring which is opposite to the region occupied by said male and female ends.

* * * * *